United States Patent
Gallo et al.

(10) Patent No.: US 6,577,562 B2
(45) Date of Patent: Jun. 10, 2003

(54) METHOD TO ALLOCATE STORAGE ELEMENTS WHILE IN A RESET STATE

(75) Inventors: Frank David Gallo, Tucson, AZ (US); Lawrence D. Tipton, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 188 days.

(21) Appl. No.: 09/824,158

(22) Filed: Apr. 2, 2001

(65) Prior Publication Data

US 2002/0141295 A1 Oct. 3, 2002

(51) Int. Cl.[7] .............................. G11B 21/08; G11B 5/10
(52) U.S. Cl. ........................ 369/30.63; 369/71; 360/128
(58) Field of Search ...................... 369/71, 72, 30.34, 369/30.38, 30.24, 30.46, 30.63; 360/128, 53, 73.03, 73.01, 73.05, 137; 15/DIG. 12

(56) References Cited

U.S. PATENT DOCUMENTS

| | | | |
|---|---|---|---|
| 4,384,311 A | 5/1983 | McNeil ..................... 360/128 |
| 4,594,617 A | 6/1986 | Tezuka ..................... 360/73.01 |
| 4,817,078 A | 3/1989 | Iwata ......................... 369/71 |
| 4,870,636 A | 9/1989 | Yamamoto .................. 369/292 |
| 5,347,407 A | * 9/1994 | Solhjell et al. ............... 360/53 |
| 5,471,451 A | * 11/1995 | Masaki et al. ................ 369/71 |
| 5,495,371 A | 2/1996 | Munemotto et al. .......... 360/71 |
| 5,548,521 A | 8/1996 | Krayer et al. ............... 700/214 |
| 5,684,766 A | 11/1997 | Inoue et al. ............. 369/30.63 |
| 5,793,714 A | 8/1998 | Inoue et al. ............. 369/30.34 |
| 5,859,755 A | * 1/1999 | Griffin et al. ............... 360/128 |
| 6,215,618 B1 | * 4/2001 | Anderson et al. ........... 360/128 |

FOREIGN PATENT DOCUMENTS

EP          0507437 A2    7/1992

* cited by examiner

Primary Examiner—Ali Neyzari
(74) Attorney, Agent, or Firm—Dale F. Regelman (57) ABSTRACT

A method to return an automated data storage and retrieval system from a reset state to the ready state. An automated data storage and retrieval system which includes a computer useable medium having computer readable program code disposed therein to implement Applicants' method to return the automated data storage and retrieval system to the ready state from a reset state. A method to allocate storage elements disposed within an automated data storage and retrieval system while that automated data storage and retrieval system is in a reset state. An automated data storage and retrieval system which includes computer readable program code disposed therein to implement Applicants' method to allocate storage elements disposed within an automated data storage and retrieval system while that automated data storage and retrieval system is in a reset state. A method to adjust the system recovery period of an automated data storage and retrieval system after that system is placed in a reset state. An automated data storage and retrieval system which includes a computer useable medium having computer readable program code disposed therein to implement Applicants' method to adjust the system recovery period of an automated data storage and retrieval system after that system is placed in a reset state.

30 Claims, 9 Drawing Sheets

METHOD TO ALLOCATE STORAGE ELEMENTS WHILE IN A RESET STATE

FIELD OF THE INVENTION

Applicants' invention relates to a method to allocate storage elements disposed within an automated data storage and retrieval system while that system is in a reset state. Applicants' invention further relates to a method to return the automated data storage and retrieval system to a ready state from a reset state. Applicants' invention further relates to a method to adjust the system recovery period during which the system is in a reset state.

BACKGROUND OF THE INVENTION

Automated media storage libraries are known for providing cost effective access to large quantities of stored media. Generally, media storage libraries include a large number of storage slots on which are stored portable data storage media. The typical portable data storage media is a tape cartridge, an optical cartridge, a disk cartridge, and the like. One (or more) accessor typically accesses the data storage media from the storage slots and delivers the accessed media to a data storage drive for reading and/or writing data on the accessed media. Suitable electronics both operate the accessor and operate the data storage drives to transmit to, and/or to receive data from, an attached on-line host computer system.

In a conventional automated media storage library, the storage slots are arranged in a planar orthogonal arrangement forming a "wall" of storage slots for holding data storage media. The plane may be a flat plane, or may be a cylindrical plane. To double the storage capacity, two "walls" of storage slots may be provided on either side of the accessor.

A number of different companies manufacture automated media storage libraries today, each model displaying various different features. One example is the IBM 3494 Media Storage Library. Some of the automated media storage libraries have dual or multiple accessors to provide a level of redundancy.

The data drives located within an automated data storage and retrieval system may become contaminated with airborne particulates, storage media debris, and other foreign material. Such contaminants may disrupt the movement of media, or the head-media interface, thereby interfering with normal operations of the device. It is therefore known to clean the internal components of a device. Numerous techniques for such cleaning of devices are known in the art. For example, U.S. Pat. No. 4,384,311 discloses a magnetic disk drive including means for cleaning the magnetic heads therein. The magnetic heads are cleaned by reducing the spindle motor speed so that the heads fly at a reduced flying height relative to their normal flying height over the disks. Particles larger than such reduced flying height are thereby scrubbed off the heads. Some device cleaning techniques require the insertion of a special portable data drive cleaning device therein. Such cartridges include means particularly suited for cleaning the transducing head of a device, such as brushes or pads. Examples of portable data drive cleaning devices are disclosed in U.S. Pat. No. 4,870,636 and U.S. Pat. No. 4,817,078, all of which relate to optical disk drives, and in U.S. Pat. No. 4,594,617, which relates to magnetic disk drives.

Data drive devices can be made to signal their need to be cleaned in numerous ways. In the simplest technique, the need for cleaning is indicated when the device stops functioning, or is manually observed functioning at a level of performance below that otherwise expected. In another technique, a device is cleaned at certain intervals of time or use which are predefined from historical observations. Each of these techniques may be improved by building the capability of self-monitoring into the device. A data drive device can be made to monitor its own level of performance, or log time or usage, and signal an operator when cleaning is required via an indicator light or console.

An automated data storage and retrieval system operates in communication with one or more host computers when in a "ready state." In such a ready state, the host computer requests access to one or more data storage media housed in one or more portable data storage cartridges located within the system. After reading data from, and/or writing data to, the data storage media disposed within those designated portable data storage cartridges, the host computer then instructs the automated data storage and retrieval system to return those cartridges to storage.

A number of scenarios exist in which an automated data storage and retrieval system switches from a ready state to a reset state. When such a transition from a ready state to a reset state occurs, one or more on-going operations may be interrupted. For example, a cleaning device may be in transit between a storage slot and a data drive device. On the other hand, a cleaning device may be disposed within a data drive device when the system switches to a reset state. What is needed is a method to allocate storage elements disposed within an automated data storage and retrieval system while that system is in a reset state, a method to return the automated data storage and retrieval system to a ready state from a reset state, and a method to adjust the system recovery period during which the system is in a reset state.

SUMMARY OF THE INVENTION

Applicants' invention includes a method to return an automated data storage and retrieval system from a reset state to the ready state, where the automated data storage and retrieval system includes one or more host computers, one or more data drive devices, one or more portable data drive cleaning devices, and a plurality of storage elements. In certain embodiments, Applicants' method allocates a different storage element for each of the system's portable cleaning devices before returning the automated data storage and retrieval system to the ready state from a reset state. Applicants' invention further includes a data storage and retrieval system which includes a computer useable medium having computer readable program code disposed therein to implement Applicants' method to return the automated data storage and retrieval system to the ready state from a reset state.

Applicants' invention further includes a method to allocate storage elements disposed within an automated data storage and retrieval system while that automated data storage and retrieval system is in a reset state. Applicants' invention further includes a data storage and retrieval system which includes a computer useable medium having computer readable program code disposed therein to implement Applicants' method to allocate storage elements disposed within an automated data storage and retrieval system while that automated data storage and retrieval system is in a reset state.

Applicants' invention further includes a method to adjust the system recovery period of an automated data storage and retrieval system after that system is placed in a reset state.

Applicants' invention further includes a data storage and retrieval system which includes a computer useable medium having computer readable program code disposed therein to implement Applicants' method to adjust the system recovery period of an automated data storage and retrieval system after that system is placed in a reset state.

BRIEF DESCRIPTION OF THE DRAWINGS

The invention will be better understood from a reading of the following detailed description taken in conjunction with the drawings in which like reference designators are used to designate like elements, and in which.

DETAILED DESCRIPTION OF THE PREFERRED EMBODIMENTS

Figure 1:
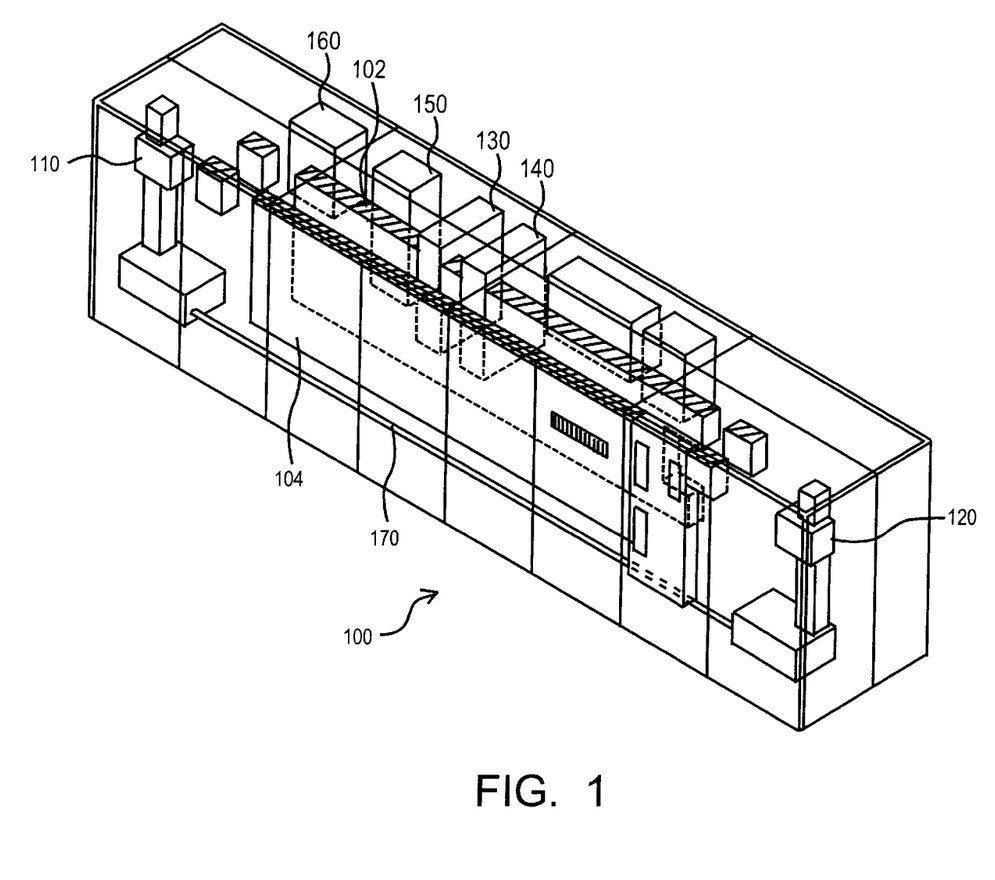
FIG. 1 is a perspective view of Applicants' automated data storage system.

Applicants' automated data storage and retrieval system comprises a plurality of storage elements. Referring to FIG. 1, automated data storage and retrieval system 100 is shown having a first wall of storage slots 102 and a second wall of storage slots 104. Data storage media are individually stored in these storage slots. The data storage media are housed within a portable container, i.e. a cartridge. Examples of such data storage media include magnetic tapes, optical disks of various types, including ROM, WORM, and rewritable, and the like.

Applicants' automated data storage and retrieval system includes one or more accessors, such as accessors 110 and 120. An accessor is a robotic device which accesses portable data storage media from first storage wall 102 or second storage wall 104, delivers that accessed media to data drive devices 130/140 for reading and/or writing data thereon, and returns the media to the proper storage slot.

In addition, accessors 110/120 also access and transport portable data drive cleaning devices stored in first storage wall 102 and/or second storage wall 104. In certain embodiments, the portable data drive cleaning devices are disposed within portable cartridges having a physical shape identical to the portable cartridges housing the data storage media disposed within Applicants' automated data storage and retrieval system. First storage wall 102 comprises a plurality of storage slots in which are stored, for example, portable data storage media and/or portable data drive cleaning devices. Second storage wall 104 comprises a plurality of storage slots in which are stored, for example, portable data storage media and/or portable data drive cleaning devices.

As shown in FIG. 1, accessors 110 and 120 travel bi-directionally along rail 170 in an aisle disposed between first wall of storage slots 102 and second wall of storage slots 104. Import/export elements located on device 160 comprise one or more interfaces with external computers, servers, libraries, and the like. Operator input station 150 permits an operator to communicate with Applicants' automated data storage and retrieval system 100.

Figure 2:
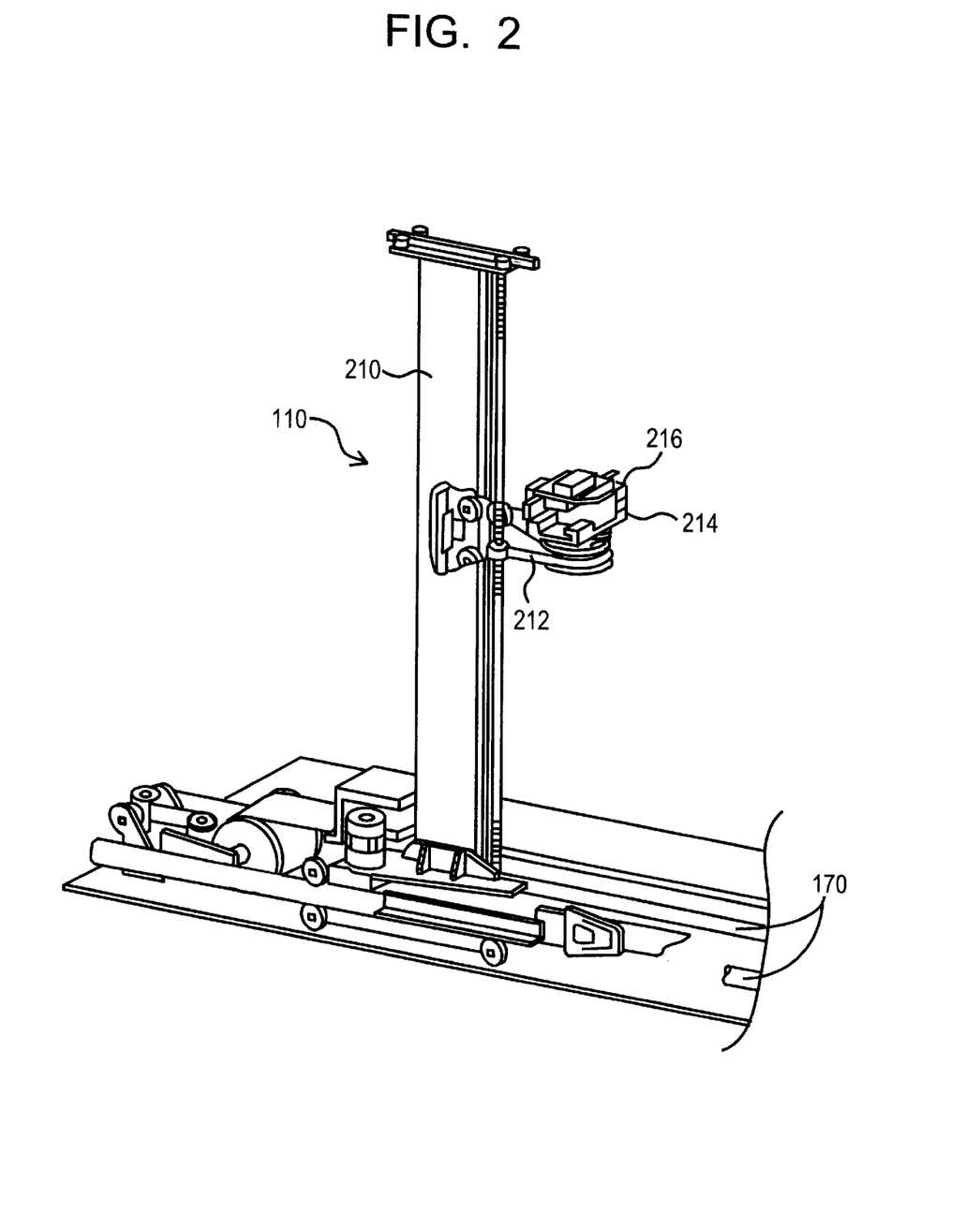
FIG. 2 is a perspective view of Applicants' accessor showing the gripping mechanisms disposed thereon.

Referring to FIG. 2, accessor 110 travels bi-directionally along rail system 170. In the embodiment shown in FIG. 2, rail system 170 comprises two parallel rails. Accessor 110 includes vertical pillar 210. Lifting servo section 212 moves vertically along pillar 210. Accessor 110 includes first gripping mechanism 214 and second gripping mechanism 216.

Figure 3:
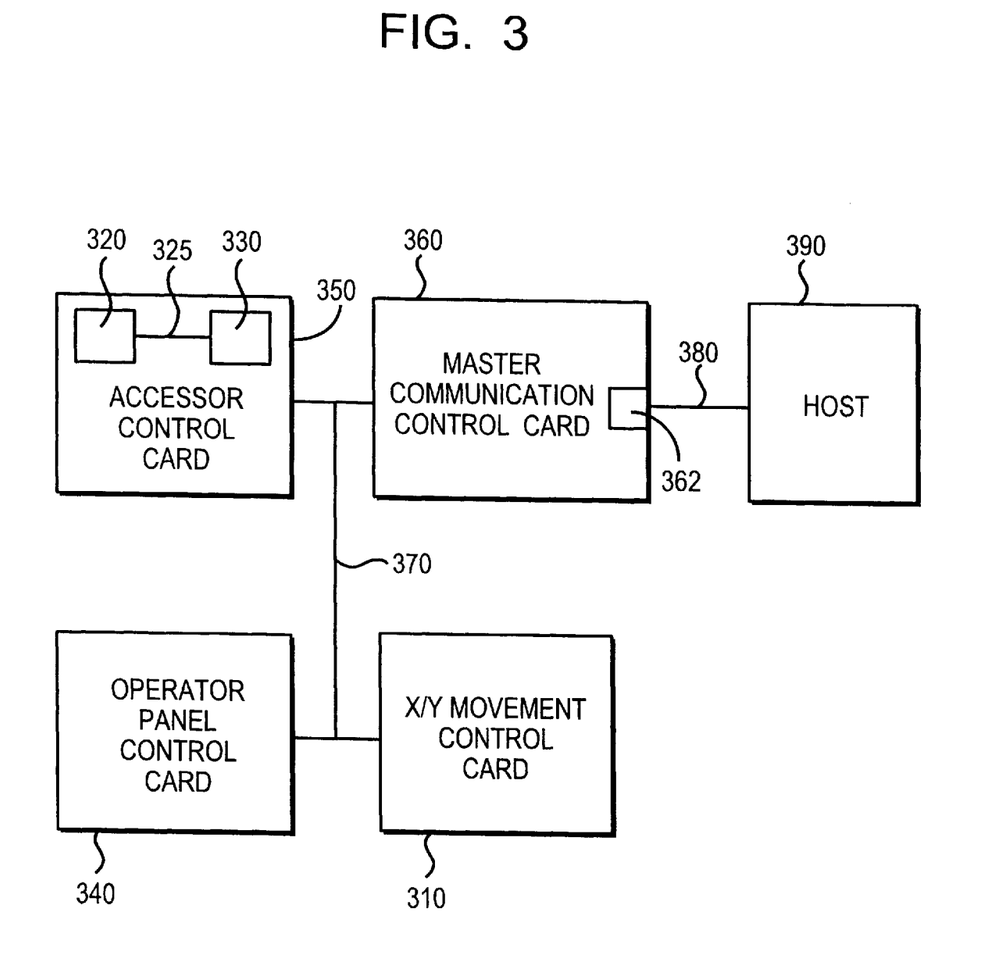
FIG. 3 is a schematic showing a first embodiment of the controller elements and communication bus disposed within Applicants' automated data storage and retrieval system.

Referring to FIG. 3, serial protocol bus 370 disposed within Applicants' automated data storage and retrieval system is in communication with accessor control card 350, master communication control card 360, X/Y control card 310, and operator control panel control card 340. In certain embodiments of Applicants' invention serial protocol bus 370 comprises an ethernet protocol bus. In other embodiments, serial protocol bus comprises a CANBUS protocol bus. Operator panel control card 340 is disposed within operator control panel 150 (FIG. 1).

X/Y movement control card 310 is disposed on each accessor, such as accessors 110 and 120 (FIG. 1). An accessor control card 350 is also disposed on each accessor movably disposed within system 100. Cleaning operation controller 320 is disposed on, and in communication with, accessor control card 350. Element status controller 330 is disposed on, and in communication with, accessor control card 350. Cleaning operation controller 320 is in communication with element status controller 330 via communication link 325.

Figure 4:
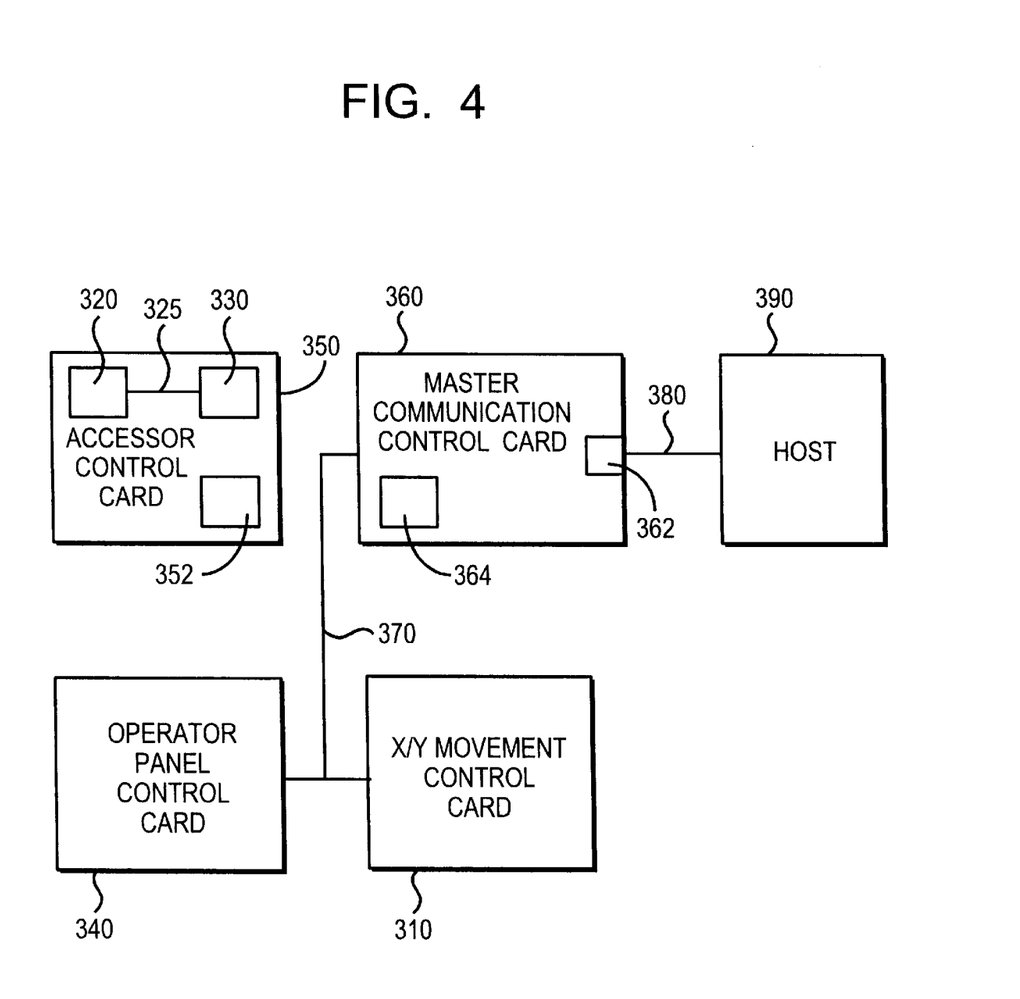
FIG. 4 is a schematic showing a second embodiment of the controller elements and communication bus disposed within Applicants' automated data storage and retrieval system.

In an alternative embodiment of Applicants' automated data storage and retrieval system shown in FIG. 4, master communication controller 360 further includes wireless communication device 364, and accessor control card 350 further includes wireless communication device 352. In this wireless communication embodiment, master communication control card 360 communicates with accessor 110 (FIGS. 1 and 2) via wireless communication devices 312 and 364. In certain embodiments of Applicants' invention, such wireless communication is conducted over frequencies between about 800 MHz and about 1.0 GHz. In other embodiments, such wireless communication is conducted using emissions within the infrared spectrum.

Master communication control card 360 includes external interface connection 362. Communication link 380 connects host computer 390 and master communication controller 360 via external interface connection 362. In various embodiments of Applicants' invention, communication link 380 comprises an RS 232 cable, a SCSI cable, a fibre channel cable, a SCSI protocol mapped over a fibre channel cable, a local area network, a private wide area network, a public wide area network, i.e. the Internet, and the like.

Figure 5:
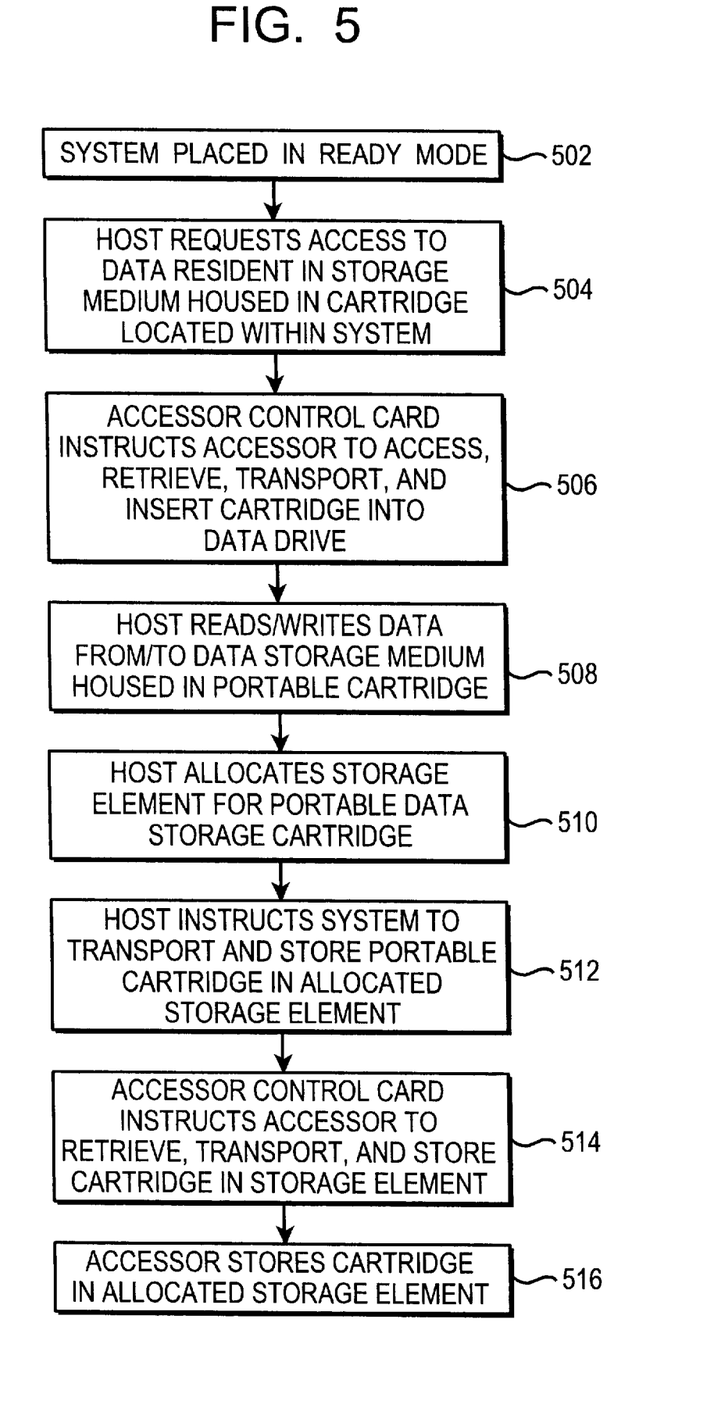
FIG. 5 is a flowchart summarizing operation of Applicants' automated data storage and retrieval system in a ready state.

FIG. 5 summarizes operation of Applicants' data storage and retrieval system 100 in the ready state. By "ready state" applicants mean an operational state of Applicants' automated data storage and retrieval system wherein one or more on-line host computers, such as host computer 390 (FIGS. 3, 4), can read data from, and/or write data to, the data storage media disposed in one or more portable data storage cartridges located within Applicants' automated data storage and retrieval system. In addition, when Applicants' system is in a ready state host computer 390 can allocate one or more storage elements disposed within system 100, i.e. one or more of the storage slots disposed in first storage wall 102 (FIG. 1) and/or second storage wall 104 (FIG. 1) for storage of one or more portable data storage cartridges disposed within Applicants' system.

Referring to FIG. 5, in step 502 the system is placed in the ready state. In step 504, host computer 390 (FIGS. 3, 4) requests access to data stored on the data storage media disposed in one or more portable data storage cartridges (not shown in FIG. 5) stored within first storage wall 102 (FIG. 1) and/or second storage wall 104 (FIG. 1) of system 100 (FIG. 1). In step 506, accessor control card 350 (FIGS. 3, 4) instructs accessor 110 (FIGS. 1, 2) to access, retrieve, transport, and insert a designated portable data storage cartridge into data drive 130 (FIG. 1) or data drive 140 (FIG. 1).

In step 508, the host computer reads data from, and/or writes data to, the data storage media disposed in the designated portable data storage cartridge. After completion of all read/write operations, in step 510 the host computer allocates a storage elements in first wall 102 and/or second wall 104 for the designated portable data storage cartridge. In step 512, the host computer then instructs system 100 to transport and store that designated cartridge. In step 514, accessor control card 350 instructs accessor 110 to retrieve the designated cartridge from data drive 130 or data drive 140, transport that cartridge to its allocated storage element, and store that cartridge in its designated storage element. In step, 516 accessor 110 or accessor 120 stores the designated cartridge in its allocated storage element.

A number of scenarios exist wherein automated data storage and retrieval system 100 switches from a ready state to a reset state. By "reset state" applicants' mean a condition wherein one or more on-line host computers, such as host computer 390 (FIGS. 3, 4), cannot read data from, and/or write data to, the data storage media disposed in one or more portable data storage cartridges located within Applicants' automated data storage and retrieval system. In addition, when Applicants' system is in a reset state on-line host computers, such as host computer 390 (FIGS. 3, 4), cannot allocate one or more storage elements disposed within system 100, i.e. one or more of the storage slots disposed in first storage wall 102 (FIG. 1) and/or second storage wall 104 (FIG. 1), for storage of one or more portable data storage cartridges disposed within Applicants' system.

For example, if a door affording access to the system is opened while the system is operating, the system, or a portion of the system, is immediately powered-down while that door remains open. Upon such an occurrence, the system switches from the ready state to a reset state. When the opened-door is closed, system 100 transitions through a system recovery period and the system is subsequently placed in a ready state. Similarly, if system 100 experiences a partial or total power failure, the system switches from the ready state to a reset state. Upon power return, system 100 transitions through a system recovery period and the system is subsequently placed in a ready state.

Figure 6:
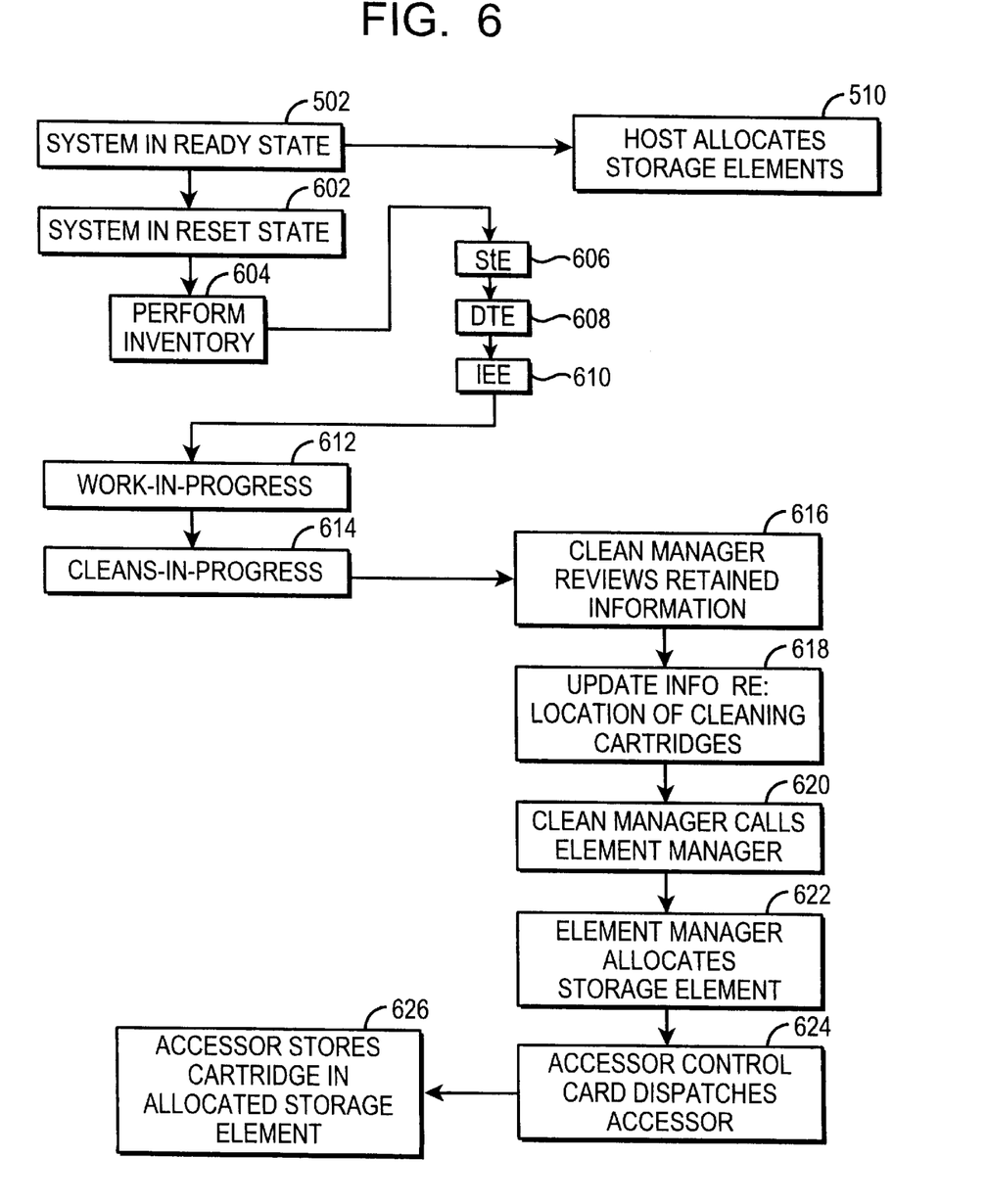
FIG. 6 is a flowchart summarizing Applicants' method to allocate storage elements while Applicants' automated data storage and retrieval system is in a reset state.

FIG. 6 summarizes Applicants' method to allocate storage elements for cleaning devices disposed within system 100 while Applicants' automated data storage and retrieval system is in a reset state. Applicants' automated data storage and retrieval system includes a computer useable medium having computer readable program code disposed therein to implement Applicants' method to allocate storage elements disposed within an automated data storage and retrieval system while that automated data storage and retrieval system is in a reset state.

When system 100 is in a ready state as illustrated by step 502, host computer 390 (FIGS. 3, 4) can perform the operations summarized in FIG. 5, including allocating storage elements in step 510. In step 602, system 100 switches from the ready state to a reset state. In such a reset state, host computer 390 cannot perform the operations shown in FIG. 5 until system 100 has again been placed in the ready state.

The transition from a reset state to a ready state, i.e. the system recovery period, includes performing an inventory of system resources in step 604. In step 606, system 100 inventories available storage elements STE, i.e. the storage slots in first storage wall 102 (FIG. 1) and/or second storage wall 104 (FIG. 1). In step 608, system 100 inventories the available data transport elements DTE, i.e. data drive units 130 and 140. In step 610, system 100 inventories the available import/export elements IEE.

After completing the inventory in step 604, system 100 then addresses Work-In-Progress in step 612. When a transition from the ready state to a reset state occurs, one or more operations may be interrupted. For example, one or more accessors may be transporting a portable data storage cartridge from a storage element to a data drive. In addition, one or more portable data storage cartridges might be disposed in one or more data drive devices when the transition occurs. These interrupted operations collectively comprise the Work-In-Progress.

In step 612, system 100 places each such Work-In-Progress operation into a known state. Placing each such interrupted operation into a known state does not necessarily require completing the interrupted operation. For example, a portable data storage cartridge disposed in a gripping mechanism of an accessor and enroute a data drive when the system switches to a reset state, may be returned in step 612 to its storage slot rather than being delivered to a data drive device.

In step 614, system 100 places each Cleans-In-Progress operation into a known state. In the first step in this process, i.e. step 616, cleaning controller 320 first examines its retained information regarding the location of each portable data drive cleaning device disposed within system 100. Cleaning controller 320 includes non-volatile memory which is not erased in the event of a complete power failure.

When system 100 is placed in a reset state, system operators can still manually move system resources, including portable data drive cleaning devices, within the system. Therefore, the location of the various portable data drive cleaning devices may have changed during the reset state time period. Therefore in step 618, cleaning controller 320 uses the inventory generated in step 604 to update the location of each portable data drive cleaning device disposed within system 100. In step 620, cleaning controller 320 calls element status controller 330 and requests a storage element be allocated for each portable data drive cleaning device not then in storage.

In step 622, element status controller 330 allocates a storage element in first wall 102 or second wall 104 for each portable data drive cleaning device currently located outside those storage areas. In step 624, accessor control card 350 instructs accessor 110 to retrieve and transport a designated portable data drive cleaning device to, and store that cleaning device in, its allocated storage element. In step 626, accessor 110 stores the designated portable data drive cleaning device in its allocated storage element.

Figure 7:
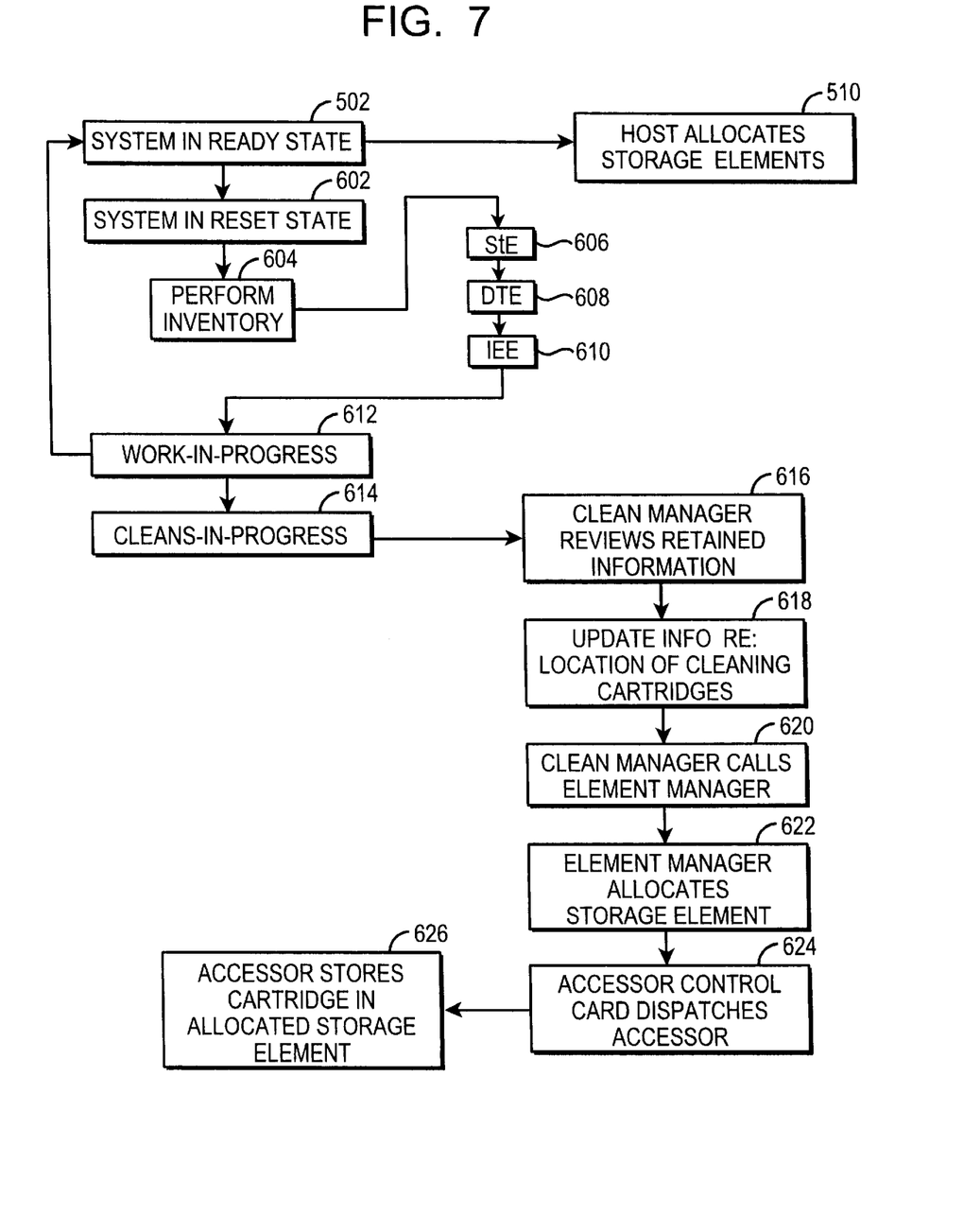
FIG. 7 is a flowchart summarizing a first embodiment of Applicants' method to return Applicants' automated data storage and retrieval system to a ready state from a reset state, and to adjust the system recovery period.
Figure 8:
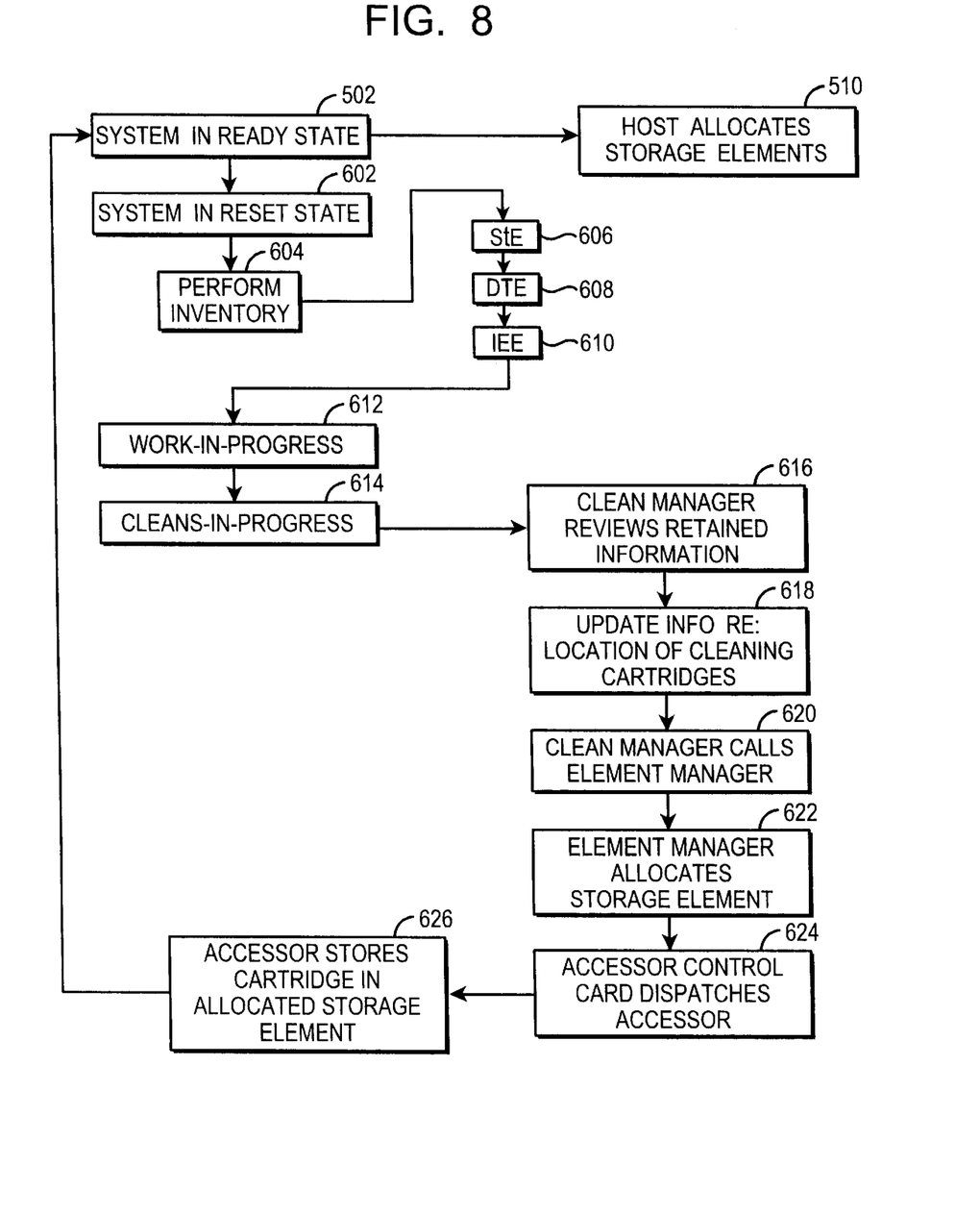
FIG. 8 is a flowchart summarizing a second embodiment of Applicants' method to return Applicants' automated data storage and retrieval system to a ready state from a reset state, and to adjust the system recovery period.
Figure 9:
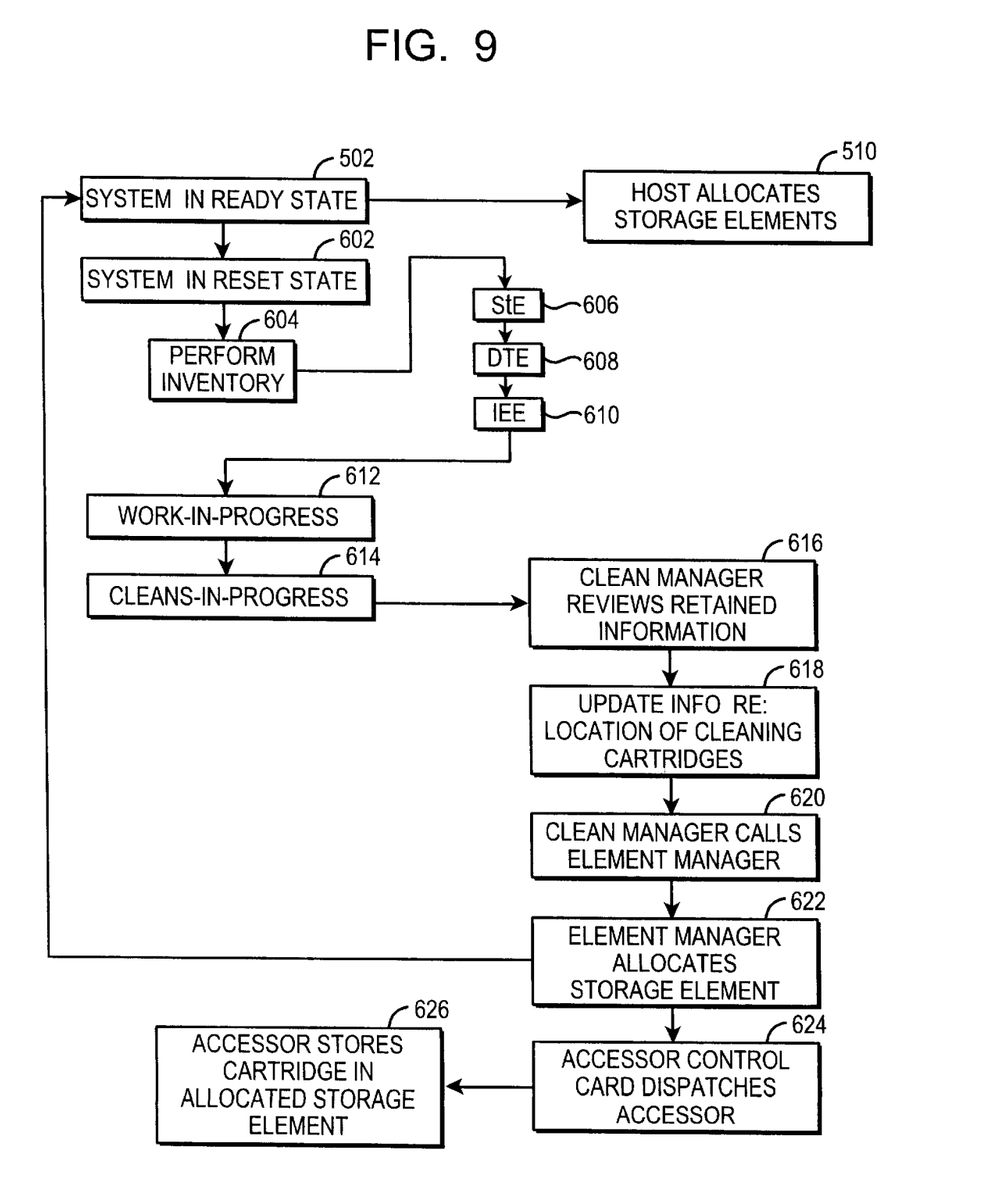
FIG. 9 is a flowchart summarizing a third embodiment of Applicants' method to return Applicants' automated data storage and retrieval system to a ready state from a reset state, and to adjust the system recovery period.

The period of time between a first time T1 when system 100 switches from a ready state to a reset state, and a second time T2 when system 100 is again placed in a ready state, comprises the system recovery period. Those skilled in the art will appreciate that overall system efficiency is enhanced by minimizing the duration of the system recovery period. Therefore, an expeditious method to transition from onset of a reset state, through the system recovery period, to return of the system to a ready state is preferred. FIGS. 7, 8, and 9 summarize three embodiments of Applicants' method to return Applicants' automated data storage and retrieval system to a ready state from a reset state. The embodiments summarized in FIGS. 7, 8, and 9 each have a differing system recovery period.

In the embodiment summarized in FIG. 7, system 100 is returned to a ready state in step 612 while the system is placing all Work-In-Progress into a known state. In this embodiment, system 100 is returned to the ready state before the Cleans-In-Progress step 614 is initiated. A problem may arise, however, when returning the system to the ready state this early. Once system 100 is returned to the ready state, host computer 390 can, among other things, allocate one or more storage elements in first storage wall 102 (FIG. 1) and/or second storage wall 104 (FIG. 1) for storage of one or more designated portable data storage cartridges. See, Step 510 (FIGS. 5, 6, 7). In step 516 (FIG. 5), accessor 110 (FIGS. 1, 2) or accessor 120 (FIG. 1) attempts to store one of such designated portable data storage cartridges in its allocated storage element.

At the same time, however, element status controller 330 (FIGS. 3, 4) can allocate one or more storage elements for storage of one or more designated portable data drive cleaning devices. See, Step 622 (FIG. 7). In step 626 (FIG. 7), accessor 110 or accessor 120 attempts to store one of those designated portable data drive cleaning devices in its allocated storage element.

In the event host computer 390 (FIGS. 3, 4) and element status controller 330 (FIGS. 3, 4) each allocates the identical storage element(s) to differing resources, one of the storage commands of step 516 or step 626 will be handled first. That first-handled storage operation will necessarily cause a failure of the subsequently attempted storage command. Returning system 100 to the ready state in step 612 minimizes the system recovery period. Such an early return of system 100 to a ready state, however, could cause command failures. Therefore under the embodiment of Applicants' method summarized in FIG. 7, system 100 is quickly returned to a ready, but unstable, state.

The embodiment of Applicants' method summarized in FIG. 8 delays returning system 100 to the ready state until the completion of all Cleans-In-Progress steps, i.e. until after completion of step 626. Those skilled in the art will appreciate that delaying the return of system 100 to the ready state until all cleaning operations have been completed, and until all portable data drive cleaning devices have been stored, could result in a lengthy system recovery period. Thus, even though the embodiment summarized in FIG. 8 cures the simultaneous allocation of storage element problem inherent in the embodiment summarized in FIG. 7, the system recovery period inherent in this embodiment is lengthy.

In the embodiment of Applicants' method to adjust the system recovery period summarized in FIG. 9, system 100 is returned to the ready state after completion of step 622, i.e. after the element status controller has allocated storage elements for each portable data drive cleaning device in use. In this embodiment, host computer 390 (FIGS. 3, 4) and element status controller 330 (FIGS. 3, 4) cannot allocate the same storage elements to differing system resources because element status controller 330 has allocated storage elements for each portable data drive cleaning device before host computer 390 can allocate storage elements for one or more portable data storage cartridges. On the other hand, system 100 is placed in the ready state before all Cleans-In-Progress operations have been completed.

Applicants' automated data storage and retrieval system includes a computer useable medium having computer readable program code disposed therein to implement the steps summarized in FIGS. 7, 8, and 9 to return Applicants' automated data storage and retrieval system to a ready state from a reset state, and to adjust the system recovery period required to return Applicants' system to a ready state from a reset state.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. A method to return an automated data storage and retrieval system from a reset state to a ready state, wherein said automated data storage and retrieval system comprises one or more host computers, a plurality of storage elements, one or more data drive devices, and one or more portable data drive cleaning devices not disposed in one or more of said plurality of storage elements, said method comprising the step of:

allocating a different one of said plurality of storage elements for each of said one or more portable data drive cleaning devices before returning said automated data storage and retrieval system to said ready state from said reset state;

disallowing allocation by said one or more host computers of one or more of said plurality of storage elements when said automated data storage and retrieval system is in said reset state; and allowing allocation by said one or more host computers of one or more of said plurality of storage elements when said automated data storage and retrieval system is in said ready state.

2. The method of claim 1, wherein said automated data storage and retrieval system further comprises a cleaning controller and an element status controller, wherein said allocating step further comprises the steps of:

generating a request by said cleaning controller to allocate a different one of said plurality of storage elements for each of said one or more portable data drive cleaning devices;

communicating said request to said element status controller; and designating by said element status controller a different one of said plurality of storage elements for each of said one or more portable data drive cleaning devices.

3. The method of claim 2, further comprising the steps of:

determining the number of said one or more portable data drive cleaning devices disposed within said automated data storage and retrieval system; and determining the location of each of said one or more portable data drive cleaning devices.

4. The method of claim 3, wherein said automated data storage and retrieval system further comprises one or more accessors moveably disposed therein, said method further comprising the steps of:

instructing one of said one or more accessors to retrieve, transport, and store one of said one or more portable data drive cleaning devices;

retrieving said one of said one or more portable data drive cleaning devices;

transporting said one of said one or more portable data drive cleaning devices; and storing said one of said one or more portable data drive cleaning devices.

5. The method of claim 4, further comprising the step of:

returning said automated data storage and retrieval system to said ready state.

6. A method to allocate storage elements disposed within an automated data storage and retrieval system while that automated data storage and retrieval system is in a reset state, wherein said automated data storage and retrieval system comprises one or more host computers, one or more data drive devices, one or more portable data drive cleaning devices, and a plurality of storage elements, comprising the step of:

allocating one or more of said plurality of storage elements for storage of said one or more portable data drive cleaning devices while said automated data storage and retrieval system is in a reset state; and disallowing allocation by said one or more host computers of one or more of said plurality of storage elements when said automated data storage and retrieval system is in said reset state.

7. The method of claim 6, wherein said automated data storage and retrieval system further comprises a cleaning controller and an element status controller, wherein said allocating step further comprises the steps of:

generating a request by said cleaning controller to allocate a different one of said plurality of storage elements for each of said one or more portable data drive cleaning devices;

communicating said request to said element status controller; and designating by said element status controller a different one of said plurality of storage elements for each of said one or more portable data drive cleaning devices.

8. The method of claim 7, further comprising the steps of:

determining the number of said one or more portable data drive cleaning devices disposed within said automated data storage and retrieval system; and determining the location of each of said one or more portable data drive cleaning devices.

9. The method of claim 8, wherein said automated data storage and retrieval system further comprises one or more accessors moveably disposed therein, said method further comprising the steps of:

instructing one of said one or more accessors to retrieve, transport, and store one of said one or more portable data drive cleaning devices;

retrieving said one of said one or more portable data drive cleaning devices;

transporting said one of said one or more portable data drive cleaning devices; and storing said one of said one or more portable data drive cleaning devices.

10. A method to adjust the system recovery period of an automated data storage and retrieval system, wherein said automated data storage and retrieval system comprises a plurality of storage elements, one or more data drive devices, one or more portable data drive cleaning devices not stored in one or more of said storage elements, and one or more host computers, said method comprising the steps of:

placing said automated data storage and retrieval system in a reset state at a first time;

allocating a different one of said plurality of storage elements for each of said one or more portable data drive cleaning devices at a second time;

returning said automated data storage and retrieval system to a ready state at a third time;

storing each of said one or more of said portable data drive cleaning devices in a different one or more of said allocated storage elements at a fourth time;

wherein the period of time between said first time and said third time comprises said system recovery period;

adjusting the period of time between said first time and said second time to be less than said system recovery period; and adjusting the period of time between said first time and said fourth time to be greater than said system recovery period.

11. The method of claim 10, wherein said adjusting steps comprise the steps of:

adjusting the period of time between said first time and said second time to be greater than said system recovery period; and adjusting the period of time between said first time and said fourth time to be greater than said system recovery period.

12. The method of claim 10, wherein said adjusting steps comprise the steps of:

adjusting the period of time between said first time and said second time to be less than said system recovery period; and adjusting the period of time between said first time and said fourth time to be equal to said system recovery period.

13. The method of claim 10, wherein said automated data storage and retrieval system further comprises a cleaning controller and an element status controller, wherein said allocating step further comprises the steps of:

generating a request by said cleaning controller to allocate a different one of said plurality of storage elements for each of said one or more portable data drive cleaning devices;

communicating said request to said element status controller; and designating by said element status controller a different one of said plurality of storage elements for each of said one or more portable data drive cleaning devices.

14. The method of claim 13, further comprising the steps of:

determining the number of said one or more portable data drive cleaning devices disposed within said automated data storage and retrieval system; and determining the location of each of said one or more portable data drive cleaning devices.

15. The method of claim 14, wherein said automated data storage and retrieval system further comprises one or more accessors moveably disposed therein, wherein said storing step further comprises the steps of:

> instructing one or more of said one or more accessors to retrieve, transport, and store each of said one or more portable data drive cleaning devices;
>
> retrieving each of said one or more portable data drive cleaning devices; and
>
> transporting each of said one or more portable data drive cleaning devices.

16. An automated data storage and retrieval system comprising a computer useable medium having computer readable program code disposed therein for returning said automated data storage and retrieval system to a ready state from a reset state, wherein said automated data storage and retrieval system comprises one or more host computers, one or more data drive devices, a plurality of storage elements, and one or more portable data drive cleaning devices not disposed within said plurality of storage elements, the computer readable program code comprising a series of computer readable program steps to effect:

> allocating a different one of said plurality of storage elements for each of said one or more portable data drive cleaning devices before returning said automated data storage and retrieval system to said ready state from said reset state;
>
> disallowing allocation by said one or more host computers of one or more of said plurality of storage elements when said automated data storage and retrieval system is in said reset state; and
>
> allowing allocation by said one or more host computers of one or more of said plurality of storage elements when said automated data storage and retrieval system is in said ready state.

17. The automated data storage and retrieval system of claim 14, wherein said automated data storage and retrieval system further comprises a cleaning controller and an element status controller, said computer readable program code further comprising a series of computer readable program steps to effect:

> generating a request by said cleaning controller to allocate a different one of said plurality of storage elements for each of said one or more portable data drive cleaning devices;
>
> communicating said request to said element status controller; and
>
> designating by said element status controller a different one of said plurality of storage elements for each of said one or more portable data drive cleaning devices.

18. The automated data storage and retrieval system of claim 17, said computer readable program code further comprising a series of computer readable program steps to effect:

> determining the number of said one or more portable data drive cleaning devices disposed within said automated data storage and retrieval system; and
>
> determining the location of each of said one or more portable data drive cleaning devices.

19. The automated data storage and retrieval system of claim 18, wherein said automated data storage and retrieval system further comprises one or more accessors moveably disposed therein, said computer readable program code further comprising a series of computer readable program steps to effect:

> instructing one of said one or more accessors to retrieve, transport, and store one of said one or more portable data drive cleaning devices;
>
> retrieving said one of said one or more portable data drive cleaning devices;
>
> transporting said one of said one or more portable data drive cleaning devices; and
>
> storing said one of said one or more portable data drive cleaning devices.

20. The automated data storage and retrieval system of claim 19, said computer readable program code further comprising a series of computer readable program steps to effect:

> returning said automated data storage and retrieval system to said ready state.

21. An automated data storage and retrieval system comprising a computer useable medium having computer readable program code disposed therein for allocating storage elements, wherein said automated data storage and retrieval system comprises one or more host computers, one or more portable data drive cleaning devices, and a plurality of storage elements, the computer readable program code comprising a series of computer readable program steps to effect:

> allocating one or more of said plurality of storage elements for said one or more portable data drive cleaning devices while said automated data storage and retrieval system is in a reset state; and
>
> disallowing allocation by said one or more host computers of one or more of said plurality of storage elements when said automated data storage and retrieval system is in said reset state.

22. The automated data storage and retrieval system of claim 21, wherein said automated data storage and retrieval system further comprises a cleaning controller and an element status controller, said computer readable program code further comprising a series of computer readable program steps to effect:

> generating a request by said cleaning controller to allocate a different one of said plurality of storage elements for each of said one or more portable data drive cleaning devices;
>
> communicating said request to said element status controller; and
>
> designating by said element status controller a different one or more of said plurality of storage elements for each of said one or more portable data drive cleaning devices.

23. The automated data storage and retrieval system of claim 22, said computer readable program code further comprising a series of computer readable program steps to effect:

> determining the number of said one or more portable data drive cleaning devices disposed within said automated data storage and retrieval system; and
>
> determining the location of each of said one or more portable data drive cleaning devices.

24. The automated data storage and retrieval system of claim 23, wherein said automated data storage and retrieval system further comprises one or more accessors moveably disposed therein, said computer readable program code further comprising a series of computer readable program steps to effect:

> instructing one of said one or more accessors to retrieve, transport, and store one of said one or more portable data drive cleaning devices;

retrieving said one of said one or more portable data drive cleaning devices;

transporting said one of said one or more portable data drive cleaning devices; and storing said one of said one or more portable data drive cleaning devices.

25. An automated data storage and retrieval system comprising a computer useable medium having computer readable program code disposed therein for adjusting the system recovery period after said automated data storage and retrieval system is placed in a reset state at a first time, wherein said automated data storage and retrieval system comprises a plurality of storage elements, one or more portable data drive cleaning devices not located in one or more of said storage elements, and one or more host computers, the computer readable program code comprising a series of computer readable program steps to effect:

allocating one or more of said plurality of storage elements for each of said one or more portable data drive cleaning devices at a second time;

returning said automated data storage and retrieval system to a ready state at a third time; and storing each of said one or more of said portable data drive cleaning devices in a different one of said plurality of storage elements at a fourth time;

wherein the period of time between said first time and said third time comprises said system recovery period;

adjusting the period of time between said first time and said second time to be less than said system recovery period; and adjusting the period of time between said first time and said fourth time to be greater than said system recovery period.

26. The automated data storage and retrieval system of claim 25, wherein said computer readable program code further comprises a series of computer readable program steps to effect:

adjusting the period of time between said first time and said second time to be greater than said system recovery period; and adjusting the period of time between said first time and said fourth time to be greater than said system recovery period.

27. The automated data storage and retrieval system of claim 25, wherein said computer readable program code further comprises a series of computer readable program steps to effect:

adjusting the period of time between said first time and said second time to be less than said system recovery period; and adjusting the period of time between said first time and said fourth time to be equal to said system recovery period.

28. The automated data storage and retrieval system of claim 25, wherein said automated data storage and retrieval system further comprises a cleaning controller and an element status controller, wherein said computer readable program code further comprises a series of computer readable program steps to effect:

generating a request by said cleaning controller to allocate a different one of said plurality of storage elements for each of said one or more portable data drive cleaning devices;

communicating said request to said element status controller; and designating by said element status controller a different one of said plurality of storage elements for each of said one or more portable data drive cleaning devices.

29. The automated data storage and retrieval system of claim 28, wherein said computer readable program code further comprises a series of computer readable program steps to effect:

determining the number of said one or more portable data drive cleaning devices disposed within said automated data storage and retrieval system; and determining the location of each of said one or more portable data drive cleaning devices.

30. The automated data storage and retrieval system of claim 29, wherein said automated data storage and retrieval system further comprises one or more accessors moveably disposed therein, wherein said computer readable program code further comprises a series of computer readable program steps to effect:

instructing one or more of said one or more accessors to retrieve, transport, and store each of said one or more portable data drive cleaning devices;

retrieving each of said one or more portable data drive cleaning devices; and transporting each of said one or more portable data drive cleaning devices.

* * * * *